Dec. 10, 1929.  C. B. BAILEY  1,738,513
GASKET
Filed May 20, 1925
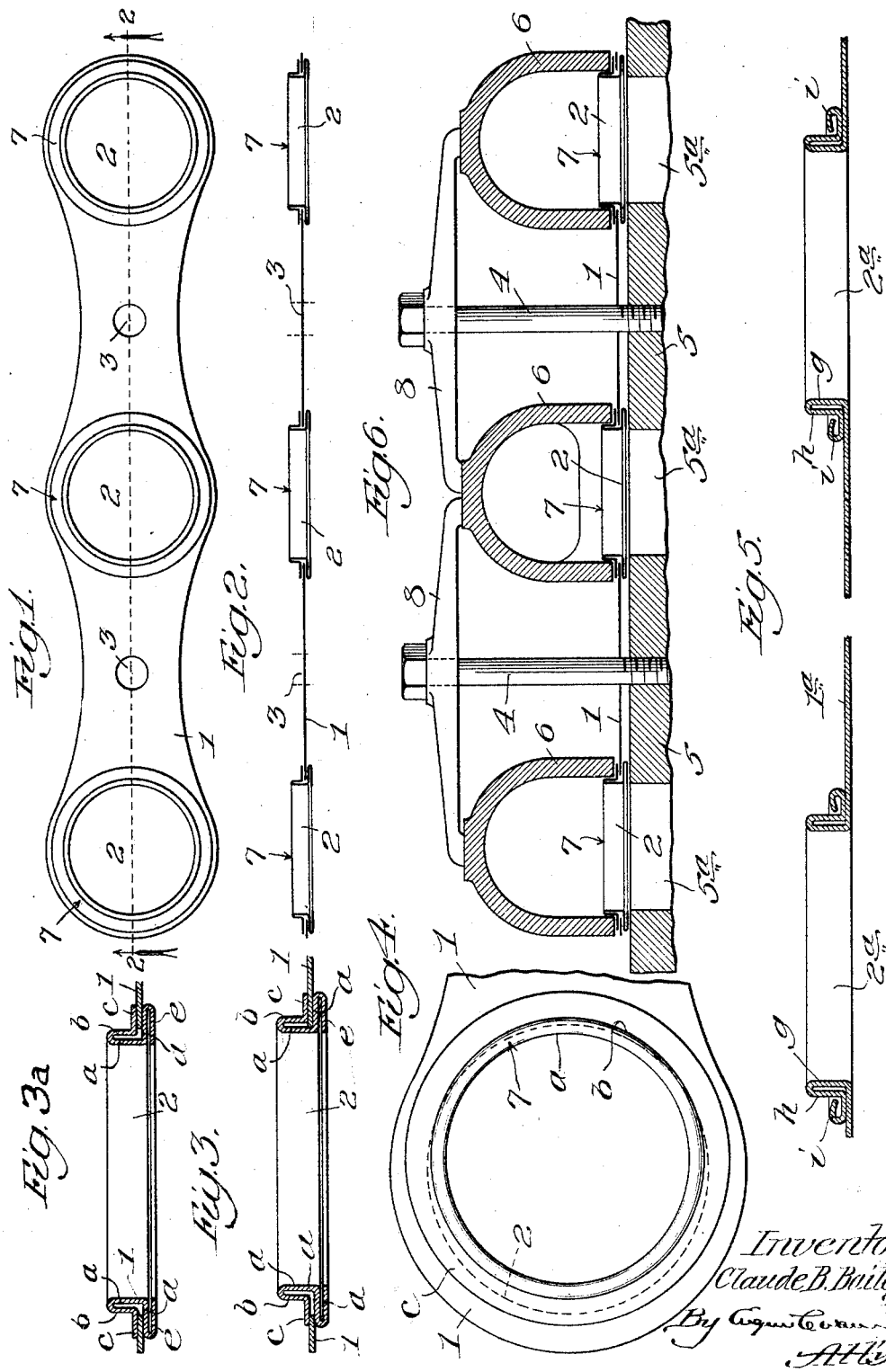

Patented Dec. 10, 1929

1,738,513

UNITED STATES PATENT OFFICE

CLAUDE B. BAILEY, OF WYANDOTTE, MICHIGAN, ASSIGNOR TO McCORD RADIATOR & MFG. CO., OF DETROIT, MICHIGAN, A CORPORATION OF MAINE

GASKET

Application filed May 20, 1925. Serial No. 31,484.

This invention has particular reference to manifold gaskets, such as are in elongated form and have a plurality of port holes spaced apart lengthwise of the gasket body so that single gaskets may accommodate a plurality of port openings in the cylinder block and associated manifolds.

One object of my invention is to make the body portion of these gaskets of a single layer of sheet metal and provide about the port holes therein relatively narrow pressure receiving portions thicker than the gasket body to provide the necessary cushions without the use of asbestos layers extending over the entire area of the gasket as heretofore, thereby simplifying and reducing the cost of manufacture of the gasket structure.

Another object of my invention is to fold up these pressure receiving portions from the metal of the sheet metal body, so that the gasket may be produced entirely of sheet metal and thus avoid the use of asbestos or other packing material as a cushion about the port holes as heretofore.

A further object of my invention is to provide, in conjunction with these pressure receiving portions, tubular guide members projecting outward from the body of the gasket and acting in conjunction with the holding studs or bolts to register the manifold openings with those of the cylinder block.

The invention consists further in the matters hereinafter described and claimed.

In the accompanying drawings—

Fig. 1 is a top plan view of a manifold gasket constructed in accordance with my invention;

Fig. 2 is a longitudinal sectional view through the gasket on line 2—2 of Fig. 1;

Fig. 3 is an enlarged vertical sectional view through the gasket at one of the port holes to more clearly show the combined pressure receiving portion and tubular guide;

Fig. 3ª is a similar view of the same parts showing the guides in a different adjusted position;

Fig. 4 is a top plan view of the parts shown in Fig. 3;

Fig. 5 is a vertical sectional view showing the pressure receiving portions and guides integral with the sheet metal body of the gasket; and Fig. 6 is a sectional view showing the gasket clamped in place between a cylinder block and its associated manifold.

The manifold gasket of my invention has a relatively narrow and elongated body portion 1 made from a single layer or piece of sheet metal, such as copper, brass, aluminum, zinc, or other suitable material. Said body 1 is provided with a plurality of port holes 2, 2 spaced apart lengthwise of the gasket body, as shown in Figs. 1 and 2. The gasket body is provided, between the holes 2, with smaller openings 3, 3 to receive the studs or bolts 4, 4 (Fig. 6) for holding the gasket in position between the cylinder block 5 and the associated manifold pipes 6, 6.

The gasket is provided with a plurality of combined pressure receiving portions and tubular guides 7, 7 carried by the gasket body 1 at each of the port holes 2, 2 and completely surrounding the same. These portions 7 are made of sheet metal and are in folded form, so that the pressure receiving portions are thicker than the body 1 of the gasket. This provides the cushion required immediately about the port holes, and allows the pressure exerted on the gasket to be concentrated on and confined to these portions in order to produce tight joints with less pressure than heretofore required.

In Figs. 1 to 3, I have shown these combined pressure receiving portions and tubular guides 7 formed independently of the sheet metal gasket body 1 and set in the openings 2, 2 about the edges of the same. The manner of folding provides the tubular guide portion of each member with inner and outer flanges $a$, $b$ joined at their outer ends by the folded edge of the metal, as shown in Fig. 3. These flanges $a$, $b$ have laterally extending base flanges $c$, $d$ which engage against the sheet metal body 1 on opposite sides thereof and serve to hold the member 7 in place on the body. The section $e$ joins the section $d$ on the under side of the body 1 and, together with the sheet metal of the body and the flange $c$, constitutes the narrow pressure receiving portion of the gasket about the hole.

In order to make the members 7 adjustable in the plane of the body 1, the port holes 2 are made normally larger so as to provide clearance or space for sliding the members 7 on the body in the plane of the same, and thus enable the members 7 to be adjusted to properly register with the port holes of the manifold 6 into which the tubular guides extend, as shown by dotted lines in Figs. 3 and 4.

In Fig. 5, I have shown the combined guides and pressure receiving members made integral with the sheet metal of the body $1^a$ so as to cheapen the cost of manufacture and make a more durable structure. In this form the metal at the edges of the openings $2^a$ of the body $1^a$ is flanged up from the plane of the body to provide the tubular guides, the latter having double flanges $g$, $h$, as shown, with the lower margin of the outer flange bent or doubled back on itself at its base to provide a folded section $i$ which, in conjunction with the metal of the body, provides a plurality of overlying folds for the pressure receiving portion of the gasket.

The gaskets shown are made entirely of sheet metal with the body portion 1 of a single layer or thickness of sheet metal. This is an important feature of my invention because it eliminates the use of the asbestos layer or cushion as heretofore employed in the manufacture of gaskets of this general kind, thereby providing a more simplified structure and one cheap and inexpensive to manufacture. In addition, my improved gasket has no parts which may be blown out in service and thus is highly efficient.

The particular gasket shown is especially designed for use with automotive manifolds. A single gasket accommodates one manifold 6 and the associated three port holes $5^a$, $5^a$ in the cylinder block 5. The studs 4 hold the gasket in place on the block, and the tubular guides of the gasket enter the ports of the manifold to center the manifold with respect to the cylinder ports and register the same therewith. The usual manifold clamps 8 engage the studs and are clamped against the manifolds by the nuts on the studs as usual in equipment of this kind.

When the guides 7 are adjustable laterally, as shown in Figs. 3 and 4, the guides may be shifted to line up with and enter the ports in manifolds that may be warped or are otherwise out of proper fit with the cylinder ports.

I claim as my invention:

A manifold gasket, having an elongated body of a single layer of sheet metal with a plurality of port holes therein spaced apart lengthwise of the body layer, and a plurality of tubular guides carried by the body layer at the respective port holes, said guides each being made of a single piece of sheet metal separate from the body layer and folded to provide inner and outer annular portions which are integrally connected at the outer edge of the guide by the fold in the metal between them, said guides being applied to the respective port holes with the annular portions of the guides extending outward from one side of the body layer and with their inner annular portions extending through the port holes, said guides having outwardly projecting lateral flanges at the bases of their annular portions with said flanges engaging the opposite sides of the body layer about the port holes, the flanges on the side of the body layer opposite the guides being folded on themselves to provide a multiple thickness of metal for said flanges.

In testimony whereof I affix my signature this 15 day of May, 1925.

CLAUDE B. BAILEY.